(12) United States Patent
Demuynck et al.

(10) Patent No.: US 7,729,492 B2
(45) Date of Patent: Jun. 1, 2010

(54) PORTABLE COMMUNICATION DEVICE HAVING A MULTI-AXIS HINGE ASSEMBLY

(75) Inventors: Randolph C. Demuynck, Wake Forest, NC (US); Charles C. Hunt, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 154 days.

(21) Appl. No.: 12/173,673

(22) Filed: Jul. 15, 2008

(65) Prior Publication Data

US 2010/0011538 A1   Jan. 21, 2010

(51) Int. Cl.
*H04M 1/00* (2006.01)
*H04M 9/00* (2006.01)

(52) U.S. Cl. .............................. 379/433.11; 379/433.12; 379/433.13; 455/575.3; 455/575.4

(58) Field of Classification Search ............ 379/433.01, 379/433.11, 433.12, 433.13; 455/90.3, 575.1, 455/575.3, 575.4; 16/235, 366, 367
See application file for complete search history.

(56) References Cited

U.S. PATENT DOCUMENTS

2005/0266897 A1   12/2005   Ahn et al.

FOREIGN PATENT DOCUMENTS

| EP | 1 798 941 | 6/2007 |
| WO | 2004/028010 | 4/2004 |
| WO | 2005/071928 | 8/2005 |

OTHER PUBLICATIONS

International Search Report and Written Opinion for International Application No. PCT/US2009/031118 dated Apr. 28, 2009.

*Primary Examiner*—Tuan D Nguyen
(74) *Attorney, Agent, or Firm*—Renner, Otto, Boisselle & Sklar, LLP

(57) ABSTRACT

A portable communication device includes a base assembly and a top assembly that is coupled to the base assembly by a multi-axis hinge assembly. The multi-axis hinge assembly is configured to facilitate sliding motion between the top assembly and the base assembly along a first direction, as well as rotation of the top assembly relative to the base assembly along perpendicular axes. The portable communication device is provided with versatile configurations and modes of operation with a smaller footprint often associated with traditional clamshell devices.

18 Claims, 3 Drawing Sheets

PORTABLE COMMUNICATION DEVICE HAVING A MULTI-AXIS HINGE ASSEMBLY

TECHNICAL FIELD OF THE INVENTION

The present invention relates generally to portable communication devices, and more particularly, to a portable communication device having a multi-axis hinge assembly that provides sliding motion and multi-axis rotation motion between a base assembly and a flip assembly.

DESCRIPTION OF RELATED ART

Portable communication devices, and in particular mobile telephones, are used for a wide variety of applications. For example, mobile phones are used not only for phone conversations and for sending/receiving messages, such as text messages, but also for browsing the internet, viewing multimedia content, such as movies or music, and for playing games, etc.

In general, the display screen on a mobile phone is limited by the size of the phone. As mobile phones are reduced in size, the surface area available for the display screen, functional keys and a keypad is reduced. In order to maximize the size of the display screen, some mobile devices are designed with a base and a display that is movable relative to the base. In these mobile phones, the keypad often is incorporated into the base and exposed only after opening/moving the display. Known mobile devices of this variety include clamshell devices, in which the display is connected to the base via a conventional rotational hinge, and slider devices, in which the display is slidable with respect to the base, for example, on a rail or a track.

SUMMARY

To enhance functionality and versatility, a portable communication device is equipped with a multi-axis hinge assembly. The multi-axis hinge assembly is configured to couple a base assembly to a flip assembly such that the flip assembly can slide past the base assembly in a direction along a first axis and to rotate about a pair of mutually perpendicular axes. The base assembly may be configured to include dynamic touch-input devices and/or display devices such that the portable communication device may be operated in a portrait orientation and/or in a landscape orientation. The provision of a multi-axis hinge assembly allows for a mobile phone that may operate in a variety of different modes and orientations, such as in a messaging/gaming mode or in a video capture mode, while maintaining a clamshell or flip form factor.

One aspect of the disclosed technology relates to a portable communication device that includes a base assembly and a top assembly coupled to the base assembly by a multi-axis hinge assembly; wherein the multi-axis hinge assembly is configured to provide sliding motion between the top assembly and the base assembly in a direction along a first axis and rotational motion about the first axis and about a second axis that is perpendicular to the first axis.

According to another embodiment, the multi-axis hinge assembly is configured to provide sliding motion of the top assembly laterally past the base assembly.

According to another embodiment, the multi-axis hinge assembly includes a sliding hinge assembly coupled to the base assembly; a flip hinge assembly coupled to a portion of the sliding hinge assembly; and a rotational element coupled to a portion of the flip hinge assembly.

According to another embodiment, the sliding hinge assembly includes a rail assembly including a rail and engagement member slidably engaging the rail.

According to another embodiment, the sliding hinge assembly includes a base hinge plate and a top hinge plate slidably coupled to the base hinge plate.

According to another embodiment, the top assembly includes an outer display that is viewable when the portable communication device is in a closed position and an inner display that is viewable when the top assembly is rotated open relative to the base assembly.

According to another embodiment, the base assembly includes a touch-sensitive input device.

According to another embodiment, the touch-sensitive input device is configured as a dynamic keypad, wherein the dynamic keypad is configured as a QWERTY keypad when the portable communication device is in a landscape orientation and the dynamic keypad is configured as a numeric keypad when the portable communication device is in a portrait orientation.

According to another embodiment, the touch-sensitive input device is configured as a dynamic keypad that is configured to adjust its representation depending upon the orientation of the portable communication device when the top assembly is opened relative to the base assembly.

According to another embodiment, the portable communication device is configurable into a phone mode when the top assembly is rotated open relative to the base assembly.

According to another embodiment, the portable communication device is configurable into a messaging/gaming mode when the top assembly is slid past the base assembly along the first axis.

According to another embodiment, the portable communication device is configurable into a messaging/gaming mode when the top assembly is slid relative to the base assembly in a direction along the first axis and the top assembly is rotated relative to the base assembly about the second axis perpendicular to the first axis.

According to another embodiment, rotation of the top assembly about the second axis reveals an inner display of the top assembly.

According to another embodiment, top assembly is rotatable about the second axis to provide an angle of about 45 degrees to about 135 degrees between the top assembly and the base assembly about the second axis.

According to another embodiment, the portable communication device is configurable into a video capture mode when the top assembly is rotated relative to the base assembly about the first axis and about the second axis.

According to another embodiment, the portable communication device is a mobile telephone.

Another aspect of the disclosed technology relates to a multi-axis hinge assembly configured to couple a first member and a second member of a portable communication device. The multi-axis hinge assembly includes a sliding hinge assembly configured to couple to an associated base assembly; a flip hinge assembly coupled to a portion of the sliding hinge assembly; and a rotational element coupled to a portion of the flip hinge assembly, the rotational element being configured to couple to an associated top assembly.

According to another embodiment, the flip hinge assembly is configured to facilitate rotational motion of the first member relative to the second member about a first axis; and the rotational element is configured to facilitate motion of the relative to the associated base assembly about a second axis perpendicular to the first axis.

According to another embodiment, the sliding hinge assembly is configured to facilitate lateral motion of the associated top assembly relative to the associated base assembly in a direction along the first axis.

Another aspect of the disclosed technology includes a portable communication device that includes a base assembly; and a flip assembly coupled to the base assembly by a multi-axis hinge assembly, wherein the multi-axis hinge assembly is configured to facilitate lateral movement of the flip assembly past the base assembly in a direction along a first axis.

According to another embodiment, the multi-axis hinge assembly is configured to facilitate rotational motion between the base assembly and the flip assembly about the first axis and about a second axis that is perpendicular to the first axis.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
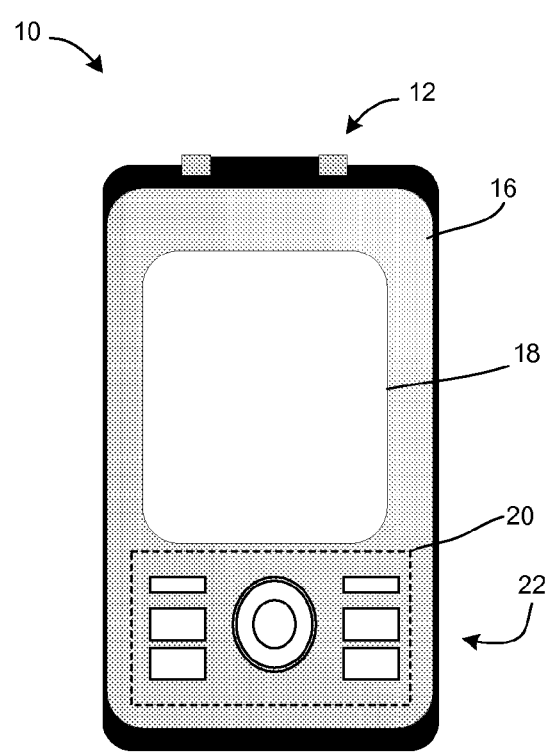
FIG. 1 is a top view of an exemplary portable communication device, such as a mobile telephone, in a closed position.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

Many portable communication devices have a limited surface area that can be used for a display screen, functional keys and a keypad. As portable communication devices become smaller and thinner in size, the surface area available for the screen and keys is reduced. To maximize the screen size, many mobile devices have incorporated the keys onto a separate surface, such as the base. The display of these mobile devices is movable with respect to the base when the keypad is accessed. Known mobile devices of these varieties include clamshell devices, in which the display is connected to the base via conventional hinge (e.g., a spring hinge) and slider devices, in which the display is slidable with respect to the base, for example, on a rail or track.

In addition, mobile phone designers struggle with phone size over function and convenience. In one respect, mobile phones having smaller footprints are desirable for their portability. Examples of such phones include phones having a clamshell form factor in which a top portion of the phone rotates between open and closed positions relative to the base, which typically includes a keypad. Another example of a phone having a smaller form factor is a "slider phone." Mobile phones with slider hinges typically include a keypad on the base that is exposed by sliding the display vertically and/or horizontally relatively to the base. Typically, the top portion is limited in lateral range for sliding, so that the entire keypad is not exposed or the exposed area is somewhat limited. Functional keys, typically located on the same surface as the display, are used for navigating menus and for initiating various functions on the device. Due to the location of the functional keys, the surface area available for the display screen is reduced, thus requiring the display screen to also be reduced in size. Furthermore, when the display is slid open, the functional keys are slid away from the user's hands, making them generally difficult to reach and/or inconvenient to use.

The smaller footprint associated with slider phones and clamshell phones often limits the phone's utility for multimedia applications, such as text messaging, surfing the web and/or gaming operations. Larger phones (e.g., phones having larger display areas and/or control areas) provide better functionality for multimedia applications, but are more cumbersome for user's to carry around.

Further, several things are occurring in the market. Operators are seeing an increase in the amount of text messaging, and many purchasers (e.g., younger users who are making greater use of text messaging) are beginning to purchase PDA-style mobile phones for the larger QWERTY keypad. One problem with this development is that operators are losing money on these mobile phones because younger users often do not subscribe to data packages (usually just unlimited text messaging).

The present disclosure recognizes shortcomings with conventional portable communication devices, including slider mobile phones and clamshell phones, as well as larger phones, and provides a portable communication device (e.g., a mobile phone) having a multi-axis hinge assembly. The multi-axis hinge assembly may be configured to couple a base assembly and a top or flip assembly such that the top assembly may be slid past the base in a direction along a first axis, and the top assembly may be rotated about a pair of perpendicular axes (e.g., about the first axis and about a second axis perpendicular to the first axis). The provision of a multi-axis hinge assembly allows for a mobile phone having a clamshell form factor that will work in multiple different configurations and modes (e.g., a standard phone configuration/mode, a messaging/gaming configuration/mode and a video/camera configuration/mode).

As referred to herein, the term "portable communication device" includes portable radio communication equipment.

The term "portable radio communication equipment", which herein after is referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While discussed with respect to portable communication devices, it is to be appreciated that the invention is not intended to be limited to portable communication devices, and can be applied to other types of handheld mobile electronic equipment equipped with a multi-axis hinge assembly.

In the context of the illustrated embodiments, the portable communication device is primarily referred to as a mobile telephone or a mobile phone. The description and illustrations of the mobile telephone, however, are intended to serve as a non-limiting exemplary environment for the inventive concepts described herein, and it will be appreciated that the invention is not intended to be limited to a mobile telephone, but rather can be any type of electronic equipment.

Figure 2:
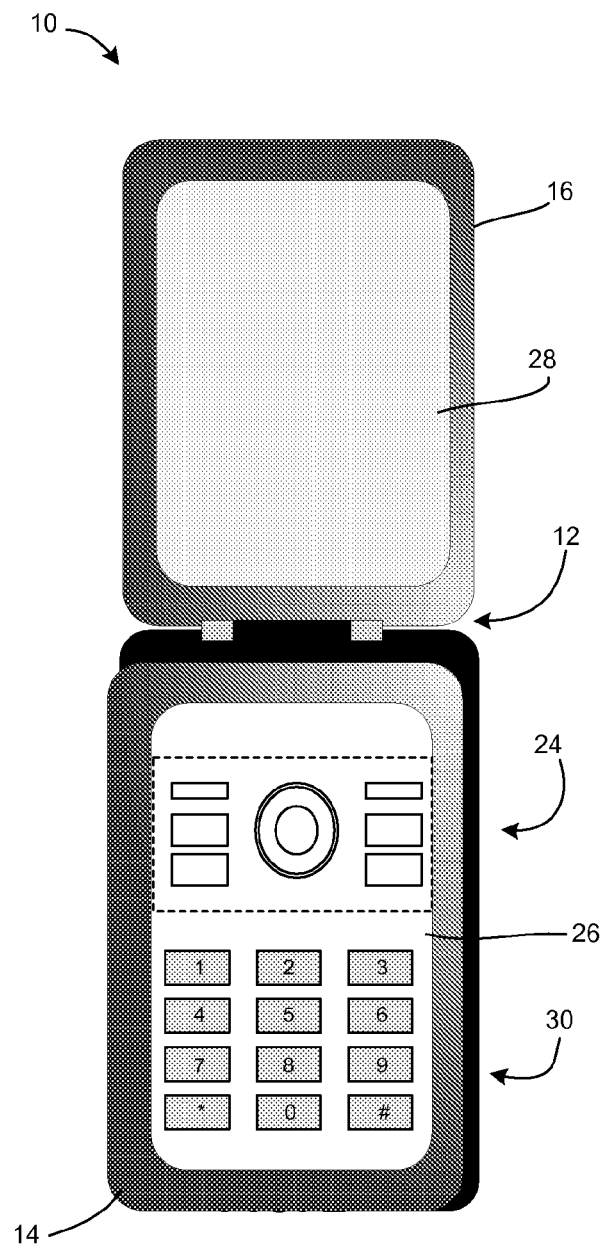
FIG. 2 is a top view of the portable communication device of FIG. 1 open in a first configuration.

Referring initially to FIG. 1 and FIG. 2, an exemplary embodiment of a portable communication device 10 (e.g., a mobile phone, a mobile terminal or the like) is shown as it would appear when operating in what is conventionally referred to as a "standby" mode. As is described more fully below, the mobile phone 10 includes a multi-axis hinge assembly 12 (also referred to simply as a hinge assembly). The multi-axis hinge assembly 12 is coupled to and provides or otherwise facilitates relative movement between a base assembly 14 and a top assembly 16 (also referred to as a flip assembly).

In the illustrated exemplary embodiment, the top assembly 16 includes an outer display 18, for example, a display that may be viewed when the phone is in a closed position and/or in a standby mode. In addition, the top assembly may include or otherwise define a touch-sensitive input area 20 (e.g., a touch input display or other touch-input control area). In the illustrated exemplary embodiment, the touch-sensitive area 20 is configured to provide functional and/or navigational keys 22. Of course, other configurations may be employed without departing from the scope of the present invention. For example, the top assembly may include a single touch-sensitive display that is dynamic and provides input and output functionality. Alternatively, or in addition, functional and/or navigational keys 24 may be provided on the base assembly by way of a touch-sensitive input device 26

The functional and/or navigational keys 22, 24 may provide for a variety of user input operations. For example, the functional keys 22, 24 typically include special function keys such as a "call send key" for initiating and answering the call and a "call end key" for ending or "hanging up" a call. Special function keys also may include menu navigation keys, for example, for navigating through a menu on the display(s) to select different telephone functions, profiles, settings, etc., as is conventional. Other navigational keys or controls may include directional keys (e.g., up, down, left, and right) to highlight different links, or icons, or to navigate text or other documents, etc. The navigational controls 22, 24 also may be in the form of a roller ball or navigational ball, as will be appreciated. Other keys associated with the mobile telephone may include a volume key, an audio mute key, an on/off power key, a web browser launch key, a camera key and the like. The navigational keys may be embodied as hard keys or soft keys implemented on a touch-sensitive input device.

The outer display 18 (e.g., a touch screen) is configured to display information to a user, such as, operating state, time, telephone numbers, contact information, menus, etc. The user also can view and utilize various features and functions related to the various operating states of the mobile phone 10 on the display 18. The display 18 also may be used to visually display content received by the mobile telephone 10 and/or retrieve from a memory of the mobile telephone 10. For example, the user can watch movies, play video games, and browse the Internet, etc., on the screen. Such audio/video materials may be stored on memory within the phone or accessed from remote servers, as will be appreciated.

As further shown in FIG. 2, and described more fully below, the mobile phone 10 includes a base assembly 14 and a top assembly 16 that each are coupled to portions of the multi-axis hinge assembly 12, such that the top assembly 16 may be translated and/or rotated relative to the base assembly 14, for example, such that the top assembly may be opened in a variety of configurations or closed. As will be described more fully below, the top assembly and base assembly each are coupled to the multi-axis hinge assembly such that the top assembly may be moved into a variety of configurations, and, therefore, the mobile phone may be used in a variety of different modes depending upon the desired application.

In the exemplary embodiment illustrated in FIG. 2, the top assembly includes the outer display 18 and a first touch-sensitive input device 20 and an inner display 28 (e.g., an inner touch-sensitive display, such as a touch screen). In the exemplary illustrated embodiment, the inner display is larger than the outer display. As is discussed more fully below, utilization of the relatively larger inner display 28 may be advantageous for a number of configurations and modes, such as a messaging/gaming mode and a video/camera mode. In an alternative embodiment, the display 28 may simply be a conventional display.

In a preferred embodiment, the base assembly 14 includes a touch-sensitive input device 26 (e.g., a touch-sensitive display or touch screen). In a preferred embodiment, the touch-sensitive input device 26 may be operated as a dynamic touch-sensitive device such that in a conventional phone call configuration/mode (in a portrait orientation) the touch-sensitive input device may provide standard alphanumeric digits 30 as well as navigational keys 24. In another mode (e.g., a messaging/gaming mode) the touch-sensitive input device 26 may be configured as a full QWERTY keypad (see, for example, FIG. 4).

In one embodiment, each touch-sensitive input device (e.g., touch-sensitive input devices 20 and 26 each are touch-sensitive displays or touch screens. Exemplary touch screens include thin film transistor (TFT) LCD screens, capacitive touch screens, and the like. It will be appreciated that different screens, such as larger or smaller screens, or other thin screen technology may be utilized without departing from the scope of the present invention.

If the mobile phone includes touch screens, the screens may be navigated by using a stylus or by otherwise touching the surface of the screen to select various functions and/or input information or data into the phone. As is described more fully below, keys or key-like functionality also may be embodied as a touch screen on the display screen, and it will be appreciated that in such embodiments, the functionality and/or navigational keys may be incorporated into the touch screen to incorporate a larger screen on the display.

Figure 3:
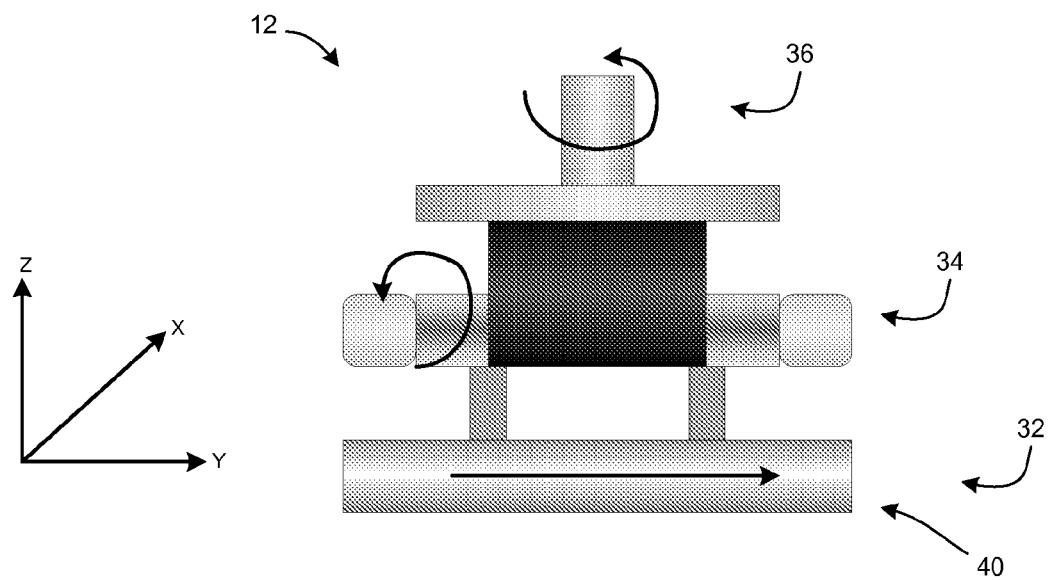
FIG. 3 is a diagrammatic illustration of an exemplary multi-axis hinge assembly.

Turning now to FIG. 3, and with continued reference to FIGS. 1 and 2, an exemplary embodiment of a multi-axis hinge assembly 12 is provided. The multi-axis hinge assembly 12 includes a sliding hinge portion 32 (e.g., cooperative rail assemblies or a rail and slot configuration), a flip hinge portion 34 (e.g., a spring hinge) and a rotational element or rotational hinge portion 36. In one embodiment, the sliding hinge portion 32 is coupled to the base assembly 14, while the rotational element is coupled to the top assembly 16. Operation of the multi-axis hinge assembly 12 will be described within the exemplary x-, y-, and z-axis coordinate system provided in the figures. However, it is to be appreciated that the coordinate system and the description of the relative movements facilitated by the multi-axis hinge assembly are exemplary and may be varied without departing from the scope of the present invention.

In one embodiment, the multi-axis hinge assembly 12 is configured to provide sliding motion between the top assembly and the base assembly in a direction substantially along the y-axis. Further, the multi-hinge assembly is configured to provide rotational motion between the top assembly and the base assembly about the y-axis or about an axis substantially parallel to the y-axis, thereby providing opening and closing of the top assembly relative to the base assembly in a typical flip or clamshell configuration. Further, the multi-axis hinge assembly is configured with a rotational element (e.g., a rotational pin) coupled to the top assembly for facilitating or otherwise providing rotation of the top assembly relative to a base assembly about an axis that is perpendicular or substantially perpendicular to the y-axis, for example, rotation about the z-axis as depicted in FIG. 3. Of course, the multi-axis hinge assembly may be configured in a different manner that is suitable to provide the described relative movements between the top assembly and the base assembly without departing from the scope of the present invention.

In one embodiment, the sliding hinge assembly 32 of the multi-axis hinge assembly 12 includes a rail assembly or track 40, which, in accordance with one embodiment, is mounted to, coupled to, or otherwise formed integrally with the base assembly 13. Alternatively, the rail or track may be mounted to, coupled to, or otherwise formed integrally with the top assembly. In an exemplary embodiment, the rail assembly includes or otherwise defines a slot suitable to slidably support an engagement member where the engagement member is coupled to the flip hinge portion 34.

Figure 6:
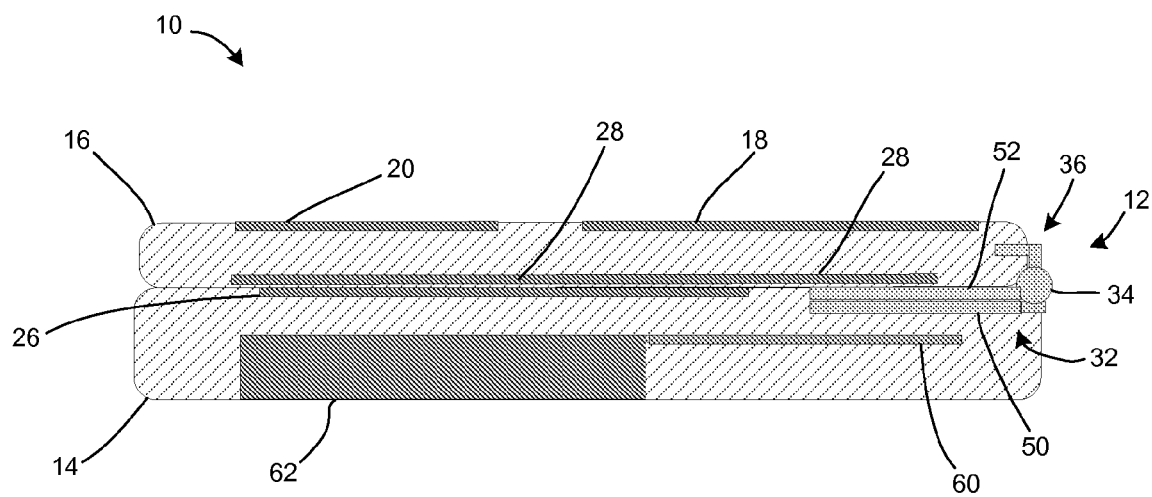
FIG. 6 is a diagrammatic illustration of a portable communication device equipped with a multi-axis hinge assembly in accordance with another exemplary embodiment.

In an alternative embodiment, illustrated in FIG. 6, the sliding hinge assembly 32 may include a pair of cooperative rail assemblies or hinge plates 50, 52. For example, the sliding assembly 32 of the multi-axis hinge assembly 12 may include a base hinge plate 50 and a top hinge plate 52 that slidably engages the base hinge plate 50. In this exemplary embodiment, the flip hinge assembly 34 is operatively coupled to a side of the top hinge plate. It will be appreciated that the multi-axis hinge assembly and its various component parts are not intended to be limited to a particular geometry. Further, the multi-axis hinge assembly (and the various portions of the multi-axis hinge assembly) may be made of any suitable material, including, but not limited to steel or another metal or plastic. One embodiment, the sliding hinge assembly, flip hinge assembly and/or rotational element of the multi-axis hinge assembly may be integrally formed with the associated base assembly or top assembly.

The exemplary embodiment provided in FIG. 6 also illustrates other components of the mobile phone. For example, the base assembly 14 also typically houses a main printed circuit board assembly (PCBA) 60 that includes the electronics, memory, and circuitry, etc., necessary for operating the mobile phone 10, including conventional call circuitry that enables the mobile telephone 10 to establish a call or otherwise exchange signals other devices, such as other mobile devices, internet web servers, media servers, or the like. The call circuitry also may be responsible for transmitting and receiving text messages, emails, or text documents. Additionally, the mobile phone 10 may include circuitry for browsing the internet, playing or viewing audio/visual materials, such as picture, music or video files and for gaming operations. Circuitry that controls the various displays and touch-sensitive input devices also is included. In one embodiment, the display control circuitry dynamically adapts the displayed output of the touch-sensitive input device 26 depending upon the mode in which the phone is operating. As is discussed more fully below, the mobile phone 10 can be configured to operate in multiple modes and in both portrait and landscape orientations depending upon the relative positions and orientations of the base assembly 14 and the top assembly 16.

In the illustrated embodiment, the main PCBA 40 is housed within the base 14 and electrically connected to a battery 62, which provides the necessary power for operating the mobile phone 10. A connector establishes an electrical connection between the battery 62 and the adjacent PCBA 60. The PCBA 60 may be connected to the various touch-sensitive input devices and/or displays with suitable flex circuitry. Alternatively, the PCBA may be connected to auxiliary PCBAs associated with the top assembly by suitable flex circuitry.

Figure 4:
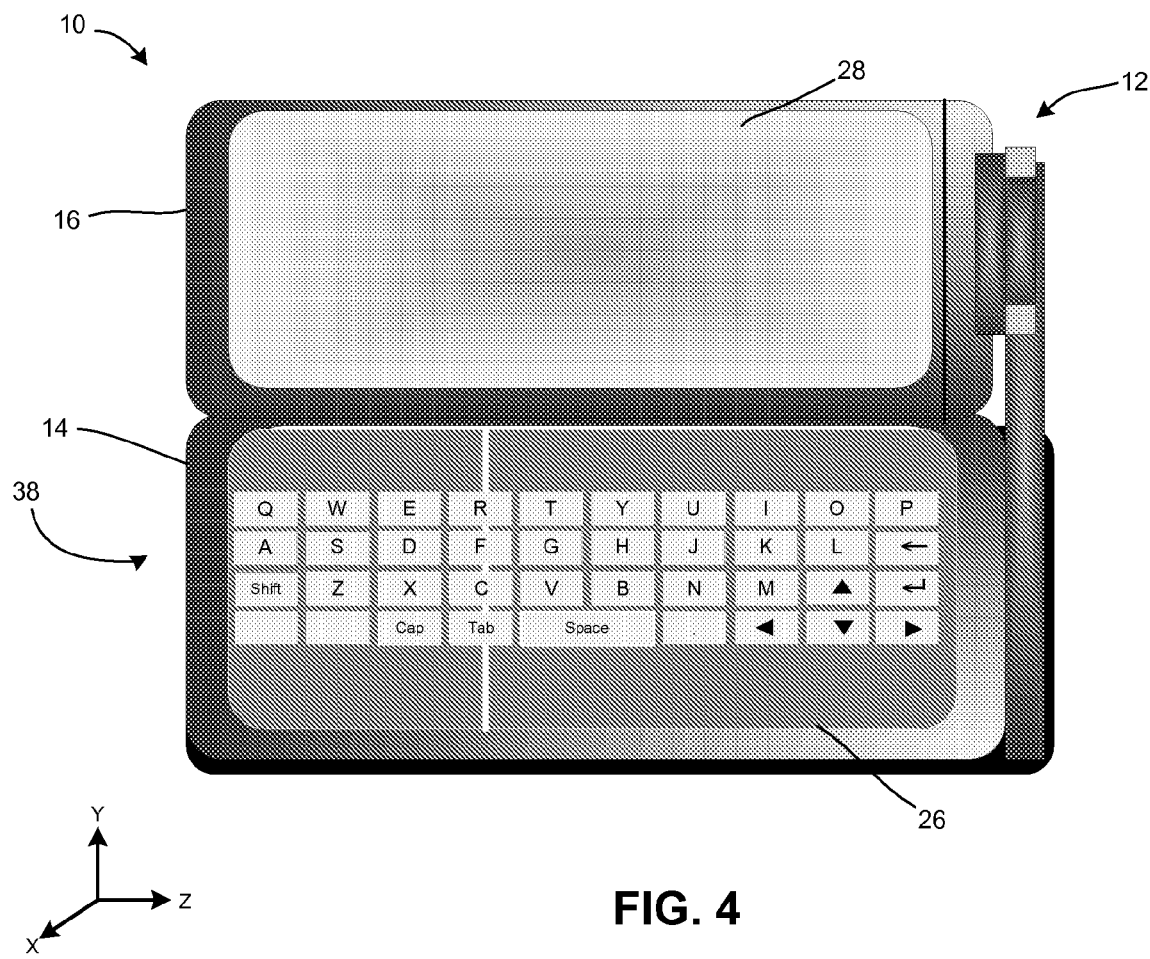
FIG. 4 is a diagrammatic illustration of the portable communication device of FIG. 1 open in a second configuration.
Figure 5:
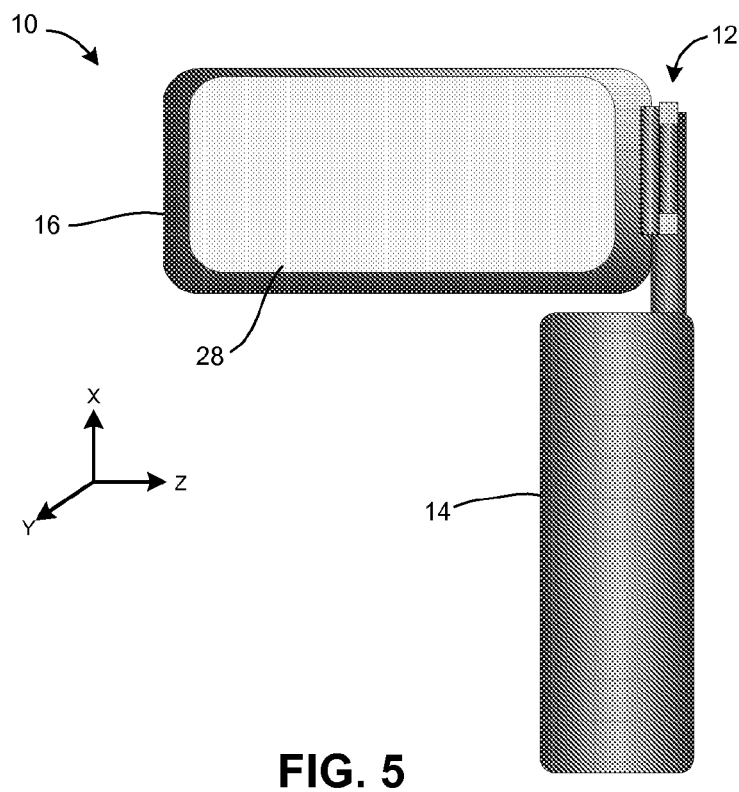
FIG. 5 is a diagrammatic illustration of the portable communication device of FIG. 1 open in a third configuration.

Referring now to FIGS. 4 and 5, the operation of the mobile phone with the multi-axis hinge assembly will be described with reference to exemplary configurations and/or modes of operation. In FIG. 4, the mobile phone 10 is shown in a messaging or gaming mode (e.g., in a landscape orientation) in which the top assembly 16 is slid or otherwise laterally translated relative to the base assembly (e.g., using the provided rail assembly or cooperative sliding hinge plates) to move the top assembly 16 laterally past the base assembly 14 (e.g., in a direction along the y-axis). Once the top assembly 16 is moved laterally past the base assembly 16, for example, by the user applying force to the top assembly 16 using his/her thumbs, the top assembly may be rotated, (e.g., about the z-axis) so that the inner display portion 28 of the top assembly 16, which oftentimes will be larger than the outer display 18 of the top assembly, may be used for messaging with the touch-sensitive input device 26 of the base assembly dynamically configured as a QWERTY keypad 38. It will be appreciated that the provision of a multi-axis hinge assembly that allows the top assembly to be translated laterally past the base assembly and rotated to provide an angle between the top assembly and the base assembly (e.g., an angle of about 45 degrees to about 135 degrees) provides performance advantages in that substantially all of the QWERTY keyboard may be revealed. Further, the provision of laterally translating the top assembly relative to the base assembly and further rotating the top assembly relative to the base assembly allows for operation for messaging and/or gaming in more of a laptop-type configuration or feel. Rotation of the top assembly (e.g., about the z-axis) also provides a benefit in adjustability of the display to reduce glare.

FIG. 5 provides another exemplary configuration of the mobile phone 10 in which the top assembly 16 is moved relative to the base assembly 14 to configure the phone in a video capture or camera mode of operation. In this exemplary embodiment, the top assembly 16 may be rotated open relative to the base assembly 14 (e.g., about the y-axis) such as occurs during normal opening or flipping of a clamshell or flip phone. Further, the top assembly may be further rotated, for example, about the z-axis relative to the top assembly such that the user may hold the phone in a more traditional video camera type of position or configuration, as shown in FIG. 5. In this mode of operation, the inner display 28 of the top assembly 16 may be viewed substantially in front of the user's eyes while the base assembly 14 may be used as more of a handle and control interface for the video capture mode of operation. Rotation of the top assembly (e.g., about the z-axis) also provides a benefit in adjustability of the display to reduce glare.

In this exemplary configuration, the mobile phone's camera or cameras (video and/or still) may be disposed or otherwise housed in a number of convenient locations such as within or adjacent the multi-axis hinge assembly or within the base assembly. Also, other camera electronics such as a flash may also be incorporated. In this video capture mode, the user is provided a relative large viewing area, which may be especially useful when capturing video using the mobile phone. Optionally, depending upon the particular configuration of the mobile phone, the top assembly may also be slid or laterally translated (e.g., in a direction along the y-axis) relative to the base assembly to provide a configuration the same as or similar to that depicted in FIG. 5.

In one embodiment, the mobile phone may be configured to prompt the user or otherwise operate in a given mode based on the configuration employed by the user. For example, if the user rotates the mobile phone in a landscape type of orientation and slides the top assembly and rotates the top assembly relative to the base assembly, the mobile phone may initiate a messaging and/or gaming mode of operation depending upon user preferences. Further, if the top assembly is rotated along two perpendicular axes such that the mobile phone is oriented to a video capture configuration, the mobile phone may initiate a video capture application by way of default.

The provision of a mobile having a multi-axis hinge assembly coupling the top assembly to the base assembly provides enhanced functionality and versatility, while maintaining a relatively compact footprint associated with a clamshell or flip-type form factor. For example, the provision of the multi-axis hinge assembly provides a conveniently-sized form factor or footprint of the phone along with versatile operation and orientation. In the traditional phone mode, the hinge assembly provides the functionality of the standard clam-style hinge. Because the multi-axis hinge assembly is capable of operating as a standard clam-style hinge, the phone may be provided with a more secure feel and operation. With the clam closed, a simple thumb press, for example, in a direction along the y-axis, puts the phone into the text messaging or gaming mode. If the user desires, he/she can rotate the top assembly so the larger inner display faces him/her during gaming or text messaging. Since the multi-axis hinge assembly allows the top assembly to move or otherwise translate past the base, the QWERTY keypad can be fully utilized. The user can adjust the display to suit his/her viewing needs similar to a laptop computer, for example, by rotating the top assembly to reduce any glare off the display. Similar glare reduction adjustability may also be found when using the phone in the video or camera mode. It will be appreciated that other modes of operation may be realized without departing from the scope of the present invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising: a base assembly; and a top assembly coupled to the base assembly by a multi-axis hinge assembly; wherein the multi-axis hinge assembly is configured to provide sliding motion of the top assembly laterally past the base assembly in a direction along a first axis and rotational motion about the first axis and about a second axis that is perpendicular to the first axis.

2. The portable communication device of claim 1, wherein the multi-axis hinge assembly comprises:
   a sliding hinge assembly coupled to the base assembly;
   a flip hinge assembly coupled to a portion of the sliding hinge assembly; and
   a rotational element coupled to a portion of the flip hinge assembly.

3. The portable communication device of claim 2, wherein the sliding hinge assembly includes a rail assembly including a rail and engagement member slidably engaging the rail.

4. The portable communication device of claim 2, wherein the sliding hinge assembly includes a base hinge plate and a top hinge plate slidingly coupled to the base hinge plate.

5. The portable communication device of claim 1, wherein the top assembly includes an outer display that is viewable when the portable communication device is in a closed position and an inner display that is viewable when the top assembly is rotated open relative to the base assembly.

6. The portable communication device of claim 5, wherein the base assembly includes a touch-sensitive input device.

7. The portable communication device of claim 6, wherein the touch-sensitive input device is configured as a dynamic keypad, wherein the dynamic keypad is configured as a QWERTY keypad when the portable communication device is in a messaging orientation and the dynamic keypad is configured as a numeric keypad when the portable communication device is in a phone call orientation.

8. The portable communication device of claim 6, wherein the touch-sensitive input device is configured as a dynamic keypad that is configured to adjust its representation depending upon the orientation of the portable communication device when the top assembly is opened relative to the base assembly.

9. The portable communication device of claim 1, wherein the portable communication device is configurable into a phone mode when the top assembly is rotated open relative to the base assembly.

10. The portable communication device of claim 1, wherein the portable communication device is configurable into a messaging/gaming mode when the top assembly is slid past the base assembly in a direction along the first axis.

11. The portable communication device of claim 1, wherein the portable communication device is configurable into a messaging/gaming mode when the top assembly is slid relative to the base assembly in a direction along the first axis and the top assembly is rotated relative to the base assembly about the second axis perpendicular to the first axis.

12. The portable communication device of claim 11, wherein rotation of the top assembly about the second axis reveals an inner display of the top assembly.

13. The portable communication device of claim 12, wherein to top assembly is rotatable about the second axis to provide an angle of about 45 degrees to about 135 degrees between the top assembly and the base assembly about the second axis.

14. The portable communication device of claim 1, wherein the portable communication device is configurable into a video capture mode when the top assembly is rotated relative to the base assembly about the first axis and about the second axis.

15. The portable communication device of claim 1, wherein the portable communication device is a mobile telephone.

16. A multi-axis hinge assembly configured to couple a first member and a second member of a portable communication device, the multi-axis hinge assembly comprising: a sliding hinge assembly configured to couple to the second assembly; a flip hinge assembly coupled to a portion of the sliding hinge assembly; and a rotational element coupled to a portion of the flip hinge assembly, the rotational element being configured to couple to the first assembly; wherein the sliding hinge assembly is configured to provide sliding motion of the first member laterally past the second member in a direction along a first axis, the flip hinge assembly is configured to facilitate rotational motion between the first member and the second member about the first axis, and the rotational element is configured to facilitate rotational motion between the first member and the second member about a second axis that is perpendicular to the first axis.

17. A portable communication device comprising: a base assembly; and a flip assembly coupled to the base assembly by a multi-axis hinge assembly, wherein the multi-axis hinge assembly is configured to facilitate sliding movement of the flip assembly laterally past the base assembly in a direction along a first axis and rotational movement between the base assembly and the flip assembly about the first axis.

18. The portable communication device of claim 17, wherein the multi-axis hinge assembly is configured to facilitate rotational motion between the base assembly and the flip assembly about the first axis and about a second axis that is perpendicular to the first axis.

* * * * *